United States Patent [19]

Belter

[11] Patent Number: 4,810,454
[45] Date of Patent: Mar. 7, 1989

[54] METHOD OF MANUFACTURING A GASKET HAVING MULTIPLE REGIONS OF DIFFERENT DENSITIES AND THICKNESSES

[75] Inventor: Jerome G. Belter, Mt. Prospect, Ill.
[73] Assignee: Dana Corporation, Toledo, Ohio
[21] Appl. No.: 875,621
[22] Filed: Jun. 18, 1986
[51] Int. Cl.⁴ ............................................. B29C 59/02
[52] U.S. Cl. .................................. 264/271.1; 264/241; 264/321; 277/235 B
[58] Field of Search ...................... 264/241, 321, 271.1; 277/235 B

[56] References Cited

U.S. PATENT DOCUMENTS

| | | | |
|---|---|---|---|
| 2,026,854 | 1/1936 | Victor | 288/1 |
| 2,058,010 | 10/1936 | Fitch | 288/1 |
| 3,352,564 | 11/1967 | Johnson | 277/180 |
| 3,655,210 | 4/1972 | Farnam et al. | 277/235 B |
| 3,668,036 | 6/1972 | Farnam | 277/235 B |
| 3,738,558 | 6/1973 | Colwell | 277/235 B |
| 3,837,657 | 9/1974 | Farnam et al. | 277/1 |
| 3,863,936 | 2/1975 | Farnam et al. | 277/166 |
| 3,866,926 | 2/1975 | Traum | 277/166 |
| 3,889,961 | 6/1975 | Farnam | 277/166 |
| 3,950,576 | 4/1976 | Desverchere | 427/284 |
| 4,213,620 | 7/1980 | Kennedy et al. | 277/235 B |
| 4,241,189 | 12/1980 | Sheldon et al. | 264/321 |
| 4,311,543 | 1/1982 | Strickman et al. | 264/321 |

FOREIGN PATENT DOCUMENTS

| | | |
|---|---|---|
| 134712 | 8/1984 | European Pat. Off. . |
| 189127 | 1/1986 | European Pat. Off. . |
| 3403875 | 8/1985 | Fed. Rep. of Germany . |
| 59-241226 | 6/1986 | Japan . |
| 465371 | 5/1937 | United Kingdom . |

Primary Examiner—Jan H. Silbaugh
Assistant Examiner—Allan R. Kuhns
Attorney, Agent, or Firm—MacMillan, Sobanski & Todd

[57] ABSTRACT

An improved gasket having multiple regions of different densities and thicknesses and a method of manufacturing same. First and second laminae of compressible gasket facings can be utilized to form a finished gasket or gasket blank having two different density regions. The first lamina has a shape which corresponds to the overall shape of the gasket. The second lamina has a shape which corresponds only to those regions of the gasket for which a higher density is desired. The first and second laminae are aligned with one another in overlapping planar relationship and pressed together by a die having opposed flat surfaces. When so pressed, the second lamina is pressed into and combined with the first lamina so as to form a unitary gasket having flat facing surfaces and two different density regions. The higher density region is defined by that portion of the first lamina material which was overlapped by the second lamina during the pressing operation, while the lower density region is defined by the non-overlapped portion of the first lamina. Multiple laminae of the gasket facings having different shapes may be utilized in this manner to form gaskets or gasket blanks having additional regions of different densities.

4 Claims, 3 Drawing Sheets

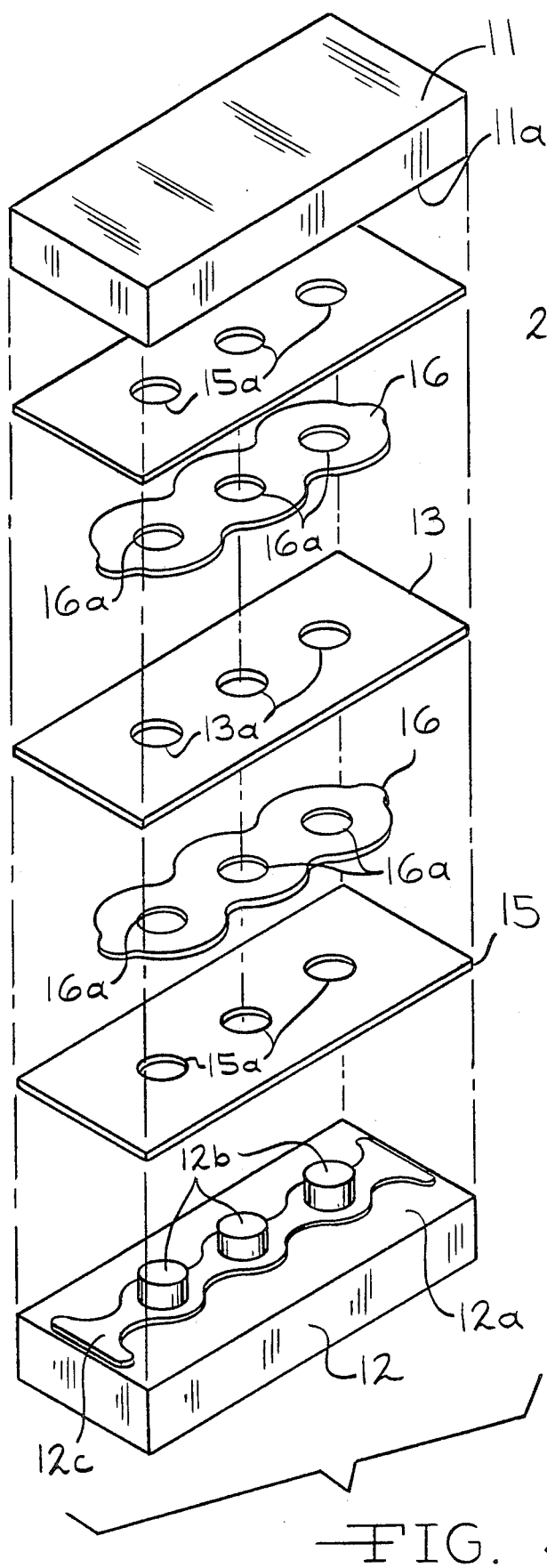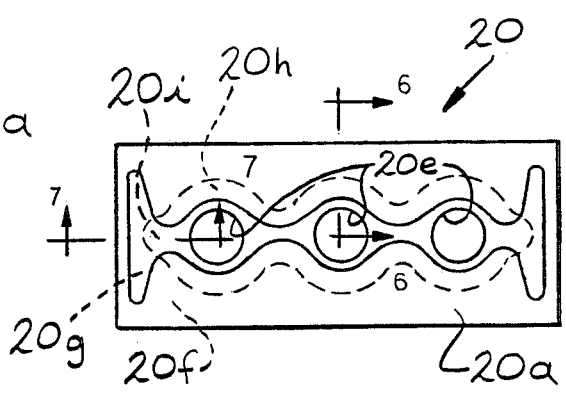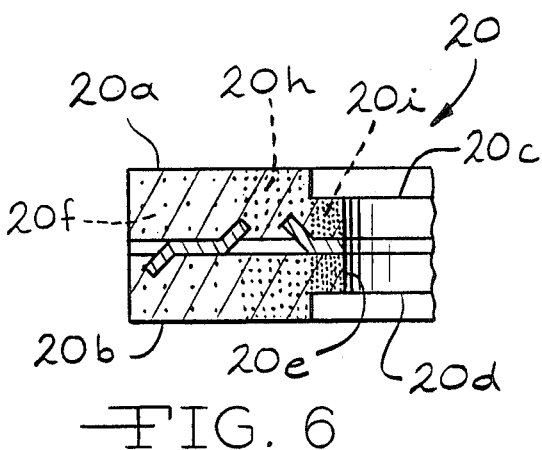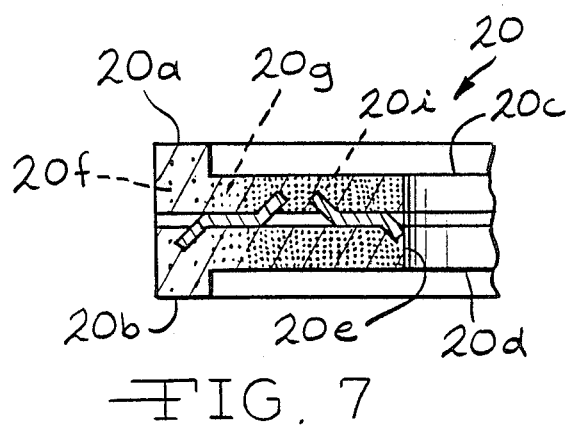

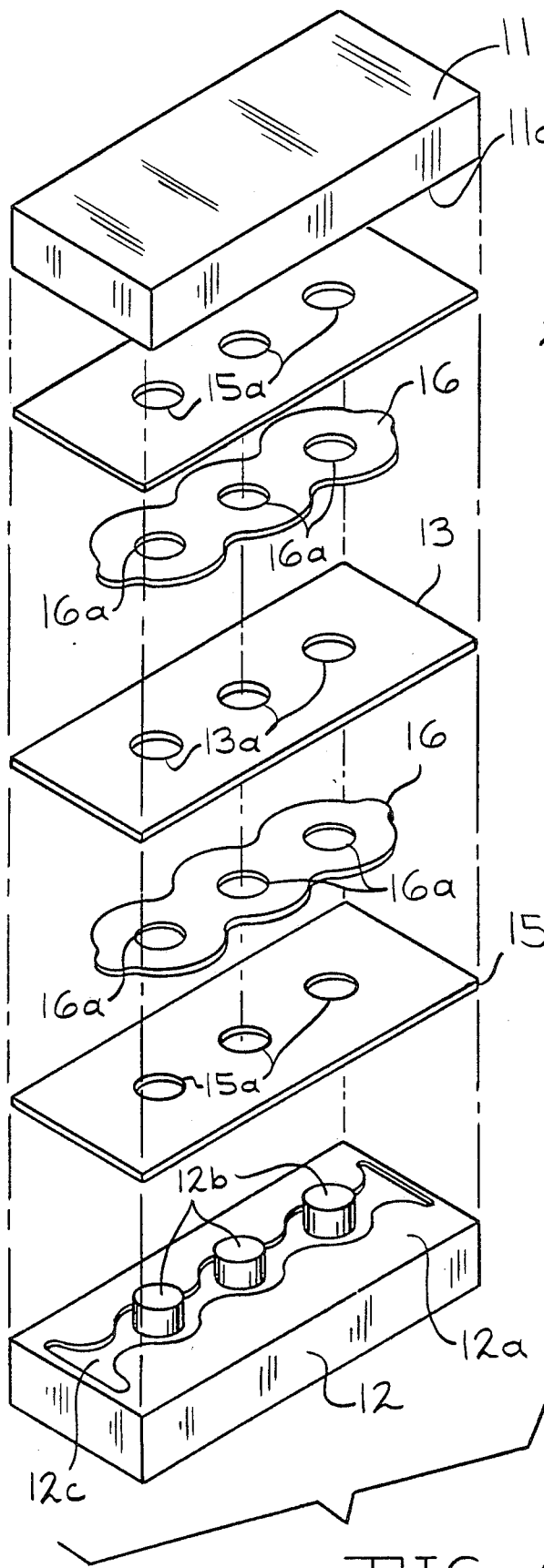
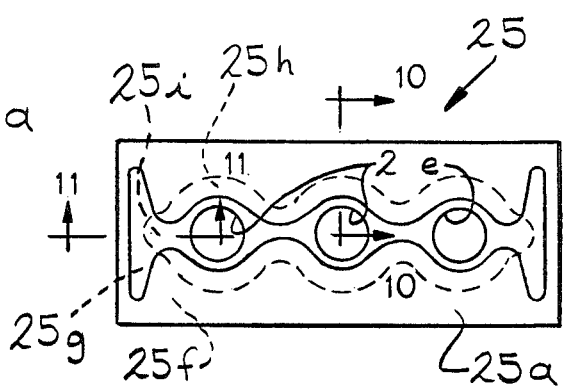
FIG. 9
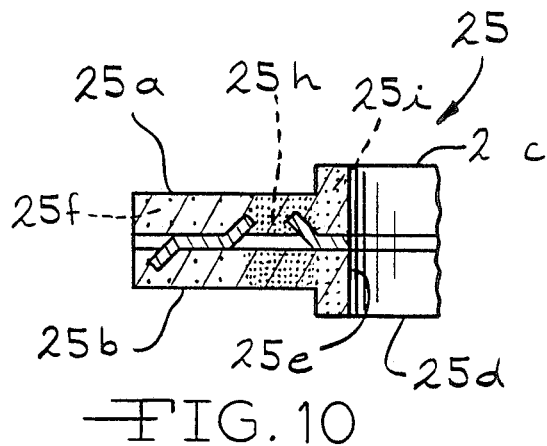
FIG. 10
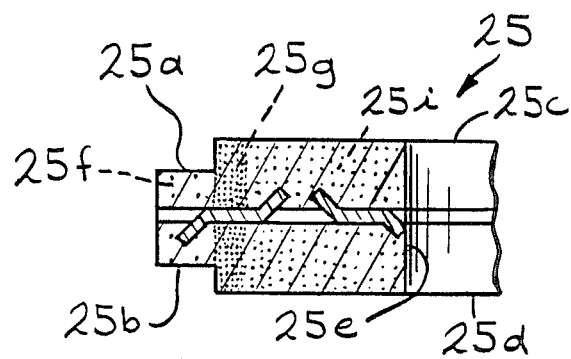
FIG. 11
FIG. 8

METHOD OF MANUFACTURING A GASKET HAVING MULTIPLE REGIONS OF DIFFERENT DENSITIES AND THICKNESSES

BACKGROUND OF THE INVENTION

The present invention relates in general to gaskets and gasket manufacturing processes and in particular to an improved gasket having multiple regions of different densities and thicknesses and a method for manufacturing same.

Gaskets are often utilized as a seal between mating mechanical components in order to prevent fluid leaks therebetween. One common application for such gaskets is within an internal combustion engine for a vehicle. Carburetors, manifolds, and cylinder heads are but a few of the components which are sealingly secured to an engine block within such internal combustion engines by means of gaskets. In order to function reliably in the environment of an internal combustion engine, the gaskets must be resistant to wear resulting from corrosion, heat, and mechanical stress. In some instances, the gaskets are formed having a metallic core in order to increase their strength. In other instances, the gaskets are formed from materials which are highly compressed in certain regions in order to increase the density, and consequently the rigidity and durability, thereof. In still other instances, the gaskets are formed having varying thicknesses in certain regions, depending upon the nature of the seal required to be effected in those regions. It is known to form a gasket having distinct regions which vary from one another in both density and thickness. However, in the past, it has been difficult and expensive to form such gaskets. Since gaskets are relatively inexpensive products, there is a continuing need for improving the manufacturing processes thereof so as to reduce costs. Such need is amplified concerning gaskets having multiple densities and thicknesses, wherein complex patterns of formation may be required.

SUMMARY OF THE INVENTION

The present invention relates to an improved gasket having multiple regions of different densities and thicknesses and a method of manufacturing same. First and second laminae of compressible gasket facings can be utilized to form a finished gasket or gasket blank having two different density regions. The first lamina has a shape which corresponds to the overall shape of the gasket. The second lamina has a shape which corresponds only to those regions of the gasket for which a higher density is desired. The first and second laminae are aligned with one another in overlapping planar relationship and pressed together by a die having opposed flat surfaces. When so pressed, the second lamina is pressed into and combined with the first lamina so as to form a unitary gasket having flat facing surfaces and two different density regions. The higher density region is defined by that portion of the first lamina material which was overlapped by the second lamina during the pressing operation, while the lower density region is defined by the non-overlapped portion of the first lamina. Multiple laminae of the gasket facings having different shapes may be utilized in this manner to form gaskets or gasket blanks having additional regions of different densities. In alternate embodiments of the present invention, the flat surfaces of the die may be provided with recessed grooves or raised embossments in certain areas. When the laminae of the gasket facings are pressed together as discussed above, the portions thereof engaged by the grooves or embossments are compressed differently than the other portions engaged by the flat surfaces of the die. Those differently compressed portions of the finished gasket or gasket blank have not only a different density than the other portions of the gasket, but also have a different thickness than the other portions of the gasket.

It is an object of the present invention to provide an improved method for forming a gasket having multiple regions of different densities and thicknesses.

It is another object of the present invention to provide such a method which is simple and economical.

Other objects and advantages of the present invention will become apparent to those skilled in the art from the following detailed description of the preferred embodiments, when read in light of the accompanying drawings.

BRIEF DESCRIPTION OF THE DRAWINGS

FIG. 4 is an exploded perspective view similar to FIG. 1 illustrating a first alternative embodiment of the present invention, wherein the flat surfaces of the die members are provided with raised embossments in certain areas.

FIG. 5 is a top plan view of a multiple density and thickness gasket blank formed by the method illustrated in FIG. 4.

FIG. 6 is a sectional elevational view taken along line 6—6 of FIG. 5.

FIG. 7 is a sectional elevational view taken along line 7—7 of FIG. 5.

FIG. 8 is an exploded perspective view similar to FIG. 1 illustrating a second alternative embodiment of the present invention, wherein the flat surfaces of the die members are provided with recessed grooves in certain areas.

FIG. 9 is a top plan view of a multiple density and thickness gasket blank formed by the method illustrated in FIG. 8.

FIG. 10 is a sectional elevational view taken along line 10—10 of FIG. 9.

FIG. 11 is a sectional elevational view taken along line 11—11 of FIG. 9.

DETAILED DESCRIPTION OF THE PREFERRED EMBODIMENTS

Figure 1:
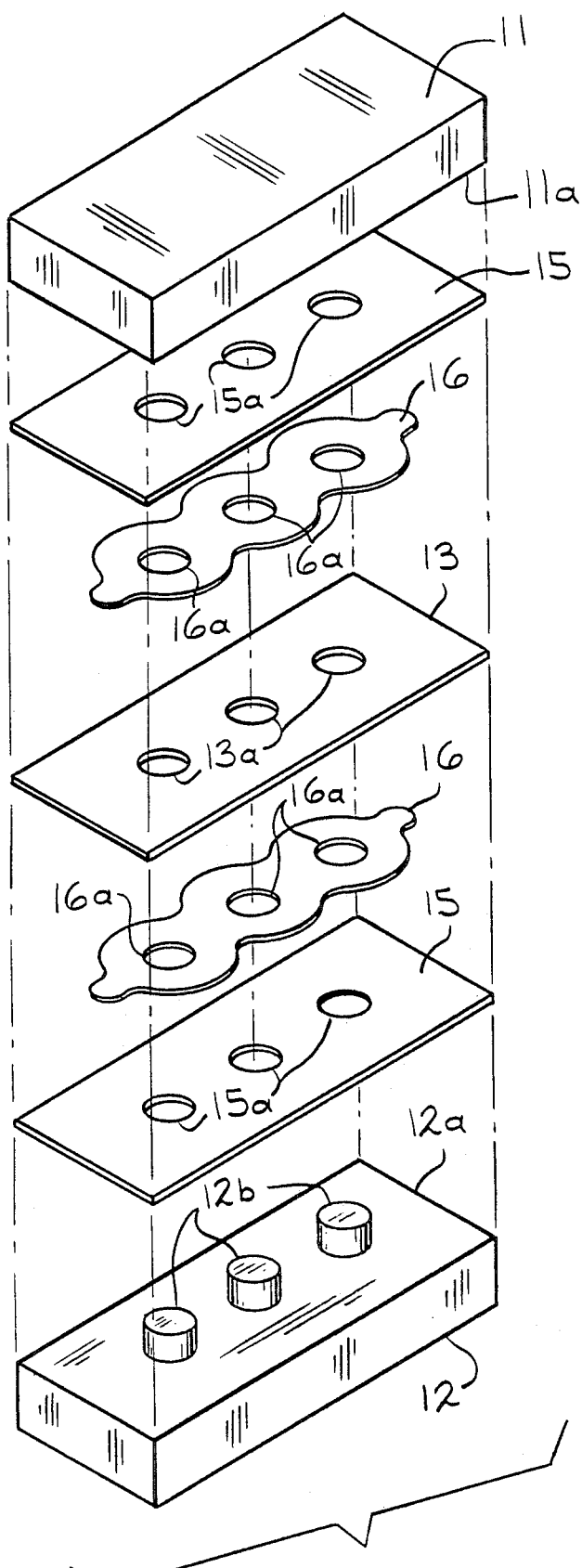
FIG. 1 is an exploded perspective view schematically illustrating a plurality of laminae of gasket materials prior to being pressed together between the opposed flat surfaces of a pair of die members.

Referring now to the drawings, there is illustrated in FIG. 1 an apparatus for forming a multiple density gasket or gasket blank in accordance with the method of the present invention. For the sale of simplicity, the present invention will be described and illustrated in the context of the formation of a gasket blank. However, as will become apparent below, the present invention can also be utilized to form a finished gasket. As shown in FIG. 1, upper and lower opposed die members 11 and 12, respectively, are provided having respective flat parallel surfaces 11a and 12a facing toward one another.

The die members 11 and 12 include locating means disposed on the flat facing surfaces 11a and 12a, respectively. In the illustrated embodiment, the locating means includes a plurality of cylindrical locators 12b formed on the flat surface 12a of the lower die member 12 and a corresponding plurality of cylindrical recesses (not shown) formed in the flat surface 11a of the upper die member 11. The cylindrical locators 12b are adapted to be received within the recesses when the upper and lower die members 11 and 12, respectively, are moved toward one another such that the opposed flat surfaces 11a and 12a may abut one another. The operation of the locating means will be explained in greater detail below.

Between the upper and lower die members 11 and 12, a plurality of laminae of gasket materials are disposed. In the illustrated embodiment, such laminae include a central core 13, respective first laminae of gasket facings 15 disposed between each side of the core 13 and the corresponding die member 11 or 12, and respective second laminae 16 of gasket facings disposed between each side of the core 13 and each of the corresponding first laminae 15. The structure of the core 13 is conventional in the art and can consist of a perforated metallic sheet having a plurality of prongs 13b (see FIGS. 2 and 3) extending normally therefrom on both sides. The first and second laminae of gasket facings 15 and 16, respectively, can be formed of any conventional compressible gasket material, such as expanded graphite and the like. The first laminae 15 of the gasket facings are each shaped to correspond with the overall shape of the finished multiple density gasket or gasket blank. The second laminae 16 of the gasket facings are each shaped to correspond only to those portions of the finished multiple density gasket or gasket blank for which higher density regions are desired.

Each of the core 13, the first laminae 15, and the second laminae 16 include respective apertures 13a, 15a, and 16a formed therethrough. The apertures 13a, 15a, and 16a correspond to the combustion openings of the gasket or gasket blank to be formed and are adapted to receive the locators 12b therethrough. As a result, the core 13, the first laminae 15, and the second laminae 16 can be disposed and retained in desired positions relative to one another on the lower die member 12 prior to the formation of the finished multiple density gasket or gasket blank. Thus, the locating means is provided to initially orient the various laminae utilized to form the finished multiple density gasket or gasket blank relative to one another. It will be appreciated that the locating means of the present invention can be embodied as any other conventional structure than that illustrated in FIG. 1 which accomplish the same positioning function.

Figure 3:
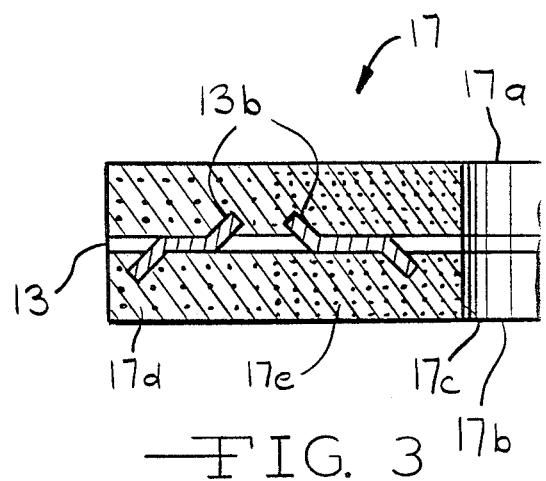
FIG. 3 is a sectional elevational view taken along line 3—3 of FIG. 2.

To form the finished multiple density gasket or gasket blank, the core 13, the first laminae 15, and the second laminae 16 are inserted about the locators 12b in the order illustrated in FIG. 1 so as to lay upon the flat surface 12a of the lower die member 12. Once so disposed, the upper and lower die members 11 and 12, respectively, are moved toward one another utilizing any conventional means. A predetermined amount of force is exerted by the die members 11 and 12 to press the core 13, the first laminae 15, and the second laminae 16 together. During this pressing operation, the pairs of the first and second laminae 15 and 16, respectively, on each side of the core 13 are pressed together to combine each pair into a unitary lamina disposed on each side of the core 13. Simultaneously, the pairs of the first and second laminae 15 and 16, respectively, on each side of the core 13 are pressed into engagement with the upstanding prongs 13b pressed formed on each side of the core 13. As is well known in the art such prongs 13b can be utilized to mechanically clinch the gasket facings to the metallic core 13. Once the pairs of the first and second laminae 15 and 16, respectively, have been pierced by the prongs 13b of the core 13, further pressing by the die members 11 and 12 causes the prongs 13b to bend inwardly toward the core 13 as illustrated in FIG. 3, thus preventing the laminae 15 and 16 from being removed from the core 13. Following this mechanical clinching step, the pressing operation is discontinued by moving the upper and lower die members 11 and 12, respectively, apart from one another.

Figure 2:
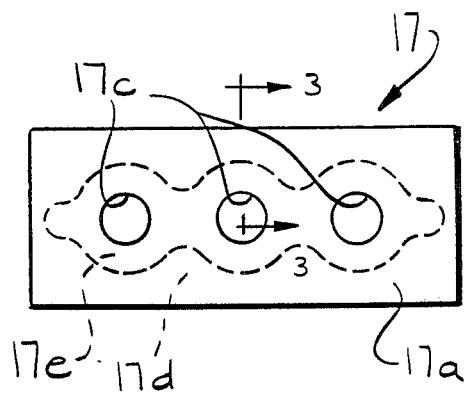
FIG. 2 is a top plan view of a multiple density gasket blank formed by the method illustrated in FIG. 1.

A multiple density gasket blank 17 formed by the above-described process is illustrated in detail in FIGS. 2 and 3. The gasket blank 17 can be cut or otherwise machined in any known manner to achieve a desired finished multiple density gasket structure. As mentioned about a finished multiple density gasket formed in accordance with the present invention has not been illustrated for the sake of simplicity. However, it will be clear to any person having skill in this art that the core 13, the first laminae 15, and the second laminae 16 may initially be shaped in accordance with the desired final shape of the finished multiple density gasket such that the pressing operation described above results in a finished gasket structure requiring little or no additional machining. Accordingly, the terms "gasket" and "gasket blank" utilized herein are used interchangeably, and the illustrated gasket blank 17 can be viewed as a finished gasket. The gasket blank 17 includes upper and lower faces 17a and 17b, respectively, having a plurality of apertures 17c formed therethrough. The upper and lower faces 17a and 17b, respectively, of the gasket blank 17 are flat because the facing surfaces 11a and 12a of the upper and lower die members 11 and 12, respectively, which engaged and compressed those portions of the gasket blank 17 were also flat. The apertures 17c correspond to the apertures 13a, 15a, and 16a described above. First and second density regions 17d and 17e, respectively, are formed within the gasket blank 17 as a result of the differently sized laminae 15 and 16. The first density region 17d extends throughout that portion of the gasket blank 17 wherein the first laminae 15 were not overlapped by the second laminae 16 during the pressing operation, as illustrated in FIG. 2. The second density region 17e extends throughout that portion of the gasket blank 17 wherein the first laminae 15 was overlapped by the second laminae 16 during the pressing operation, also as illustrated in FIG. 2. Thus, the first density region 17d consists only of the compressed portions of the first laminae 15, while the second density region 17e consists of the compressed portions of both the first and second laminae 15 and 16, respectively. Consequently, the density of the first density region 17d is less than the density of the second density region 17e, even though the upper and lower faces 17a and 17b, respectively, are flat throughout the entire extent of the gasket blank 17. The structure of the gasket blank 17 is unique because the different density regions 17d and 17e are formed by the compression of different amounts of gasket material into a uniform thickness. As best illustrated in FIG. 3, the overall thickness of the gasket blank 17 is constant, as is the thickness of each of the combined gasket materials clinched on either side of the core 13, throughout both of the density regions 17d and 17e.

The above-described process illustrates one method of forming a gasket blank 17 having distinct regions of lower and higher density 17d and 17e, respectively, while maintaining a uniform thickness throughout the gasket 17. The number of the laminae 15 and 16 of the gasket facings may be varied as desired. For example, in certain applications, it may be desirable to form the multiple density gasket only from a single first lamina 15 and the second lamina 16, thus omitting the core 13 and the other first and second laminae 15 and 16, respectively. Conversely, additional laminae of the gasket facings having different shapes may be utilized to create a multiple density gasket having more than two density regions. For example, if three laminae of the gasket facings were utilized, each having a different shape, three distinct regions having different densities could be formed by the method of the present invention. Furthermore, if each of the three laminae of the gasket facings differed from the others in thickness, a greater number of distinct density regions could be formed utilizing the method of the present invention, although the thickness of the finished gasket or gasket blank would be uniform as described above. Alternatively, it may be desirable to replace the central core 13 with one or more external cores to create the structure disclosed in co-pending U.S. patent application Ser. No. 870,509 filed June 4, 1986, and assigned to the assignee of the present invention. To form such a structure, one or both of the first laminae 15 would be replaced by a perforated metallic core having prongs formed on one face only, while the central core 13 would be replaced by one or more laminae of the gasket facings. Thus, it will be appreciated that the method of the present invention can be utilized to quickly and easily form a multiple density gasket having virtually any pattern of density regions located therein.

Referring now to FIG. 4, there is illustrated an apparatus for forming a multiple density gasket in accordance with a first alternate embodiment of the method of the present invention. The apparatus illustrated in FIG. 4 is basically identical to the apparatus illustrated in FIG. 1, and like reference numerals are utilized therein to indicate common elements thereof. The lower die member 12 of the apparatus illustrated in FIG. 4, however, is provided with a raised embossment 12c in certain areas of the lower flat surface 12a thereof, which embossment 12c is not included in the lower die member 12 illustrated in FIG. 1. The upper die member 11 illustrated in FIG. 4 is also provided a raised embossment (not shown) which is co-extensive with the lower embossment 12c. The apparatus illustrated in FIG. 4 can be utilized as described above o form a modified gasket blank 20, illustrated in detail in FIGS. 5 through 7, having multiple regions of different densities and thicknesses. As illustrated therein, the gasket blank 20 includes generally flat upper and lower faces 20a and 20b, respectively, having respective upper and lower recessed surfaces 20c and 20d formed therein. The flat faces 20a and 20b of the gasket blank 20 correspond to those portions of the laminae 15 and 16 which were engaged by the flat surfaces 11a and 12a of the die members 11 and 12, respectively, during the pressing operation. The recessed surfaces 20c and 20d of the gasket blank 20 correspond to those portions of the laminae 15 and 16 which were engaged by the embossments 12c during the pressing operation. Thus, the embossments 12c are provided to generate regions of different thicknesses within the gasket blank 20. Apertures 20e correspond to the apertures 17c described above.

The gasket blank 20 includes a first density region 20f, a second density region 20g, a third density region 20h, and a fourth density region 20i. The first density region 20f extends throughout that portion of the gasket blank 20 wherein the first laminae 15 were not overlapped by the second laminae 16 during the pressing operation and wherein the first laminae 15 were engaged by the flat surfaces 11a and 12a of the upper and lower die members 11 and 12, respectively. Thus, the first density region 20f consists only of the first laminae 15 being compressed to the relatively greater thickness defined by the flat upper and lower faces 20a and 20b, respectively, of the gasket blank 20. The second density region 20g extends throughout that portion of the gasket blank 20 wherein the first laminae 15 were not overlapped by the second laminae 16 during the pressing operation and wherein the first laminae 15 were engaged by the embossments 12c. Thus, the second density region 12g consists only of the first laminae being compressed to the relatively lesser thickness defined by the upper and lower recessed surfaces 20c and 20d, respectively, of the gasket blank 20. The third density region 20h extends throughout that portion of the gasket blank 20 wherein the first laminae 15 were overlapped by the second laminae 16 during the pressing operation and wherein the first and second laminae 15 and 16, respectively, were engaged by the flat upper and lower faces 11a and 12a of the upper and lower die members 11 and 12, respectively. Thus, the third density area 20h consists of both the first and second laminae 15 and 16, respectively, being compressed to the relatively greater thickness defined by the flat upper and lower faces 20a and 20b, respectively, of the gasket blank 20. Finally, the fourth density area 20i extends throughout that portion of the gasket blank 20 wherein the first laminae 15 were overlapped by the second laminae 16 during the pressing operation and wherein the first and second laminae were engaged by the embossments 12c. Thus, the fourth density region 20i consists of both the first and second laminae 15 and 16, respectively, being compressed to the relatively lesser thickness defined by the recessed surfaces 20c and 20d, respectively, of the gasket blank 20.

From the above discussion of the present invention, many variations will become apparent to those skilled in the art. For example, additional embossments may be provided on the upper and lower die members 11 and 12, respectively, having different heights than the illustrated embossments 12c. Such a structure would yield a finished gasket having more than two different thicknesses. Thus, by varying the number of different laminae 15 and 16 utilized to form the gasket blank 20, the shapes of the various laminae 15 and 16 so utilized, and the shapes and configurations of the embossments 12c on the die members 11 and 12, the method of the present invention can be utilized to form a gasket blank 20 having virtually any configuration of density regions and thicknesses.

Referring now to FIG. 8, there is illustrated an apparatus for forming a multiple density gasket in accordance with a second alternate embodiment of the method of the present invention. The apparatus illustrated in FIG. 8 is basically identical to the apparatus illustrated in FIG. 1, and like reference numerals are utilized therein to indicate common elements thereof. The lower die member 12 of the apparatus illustrated in FIG. 8, however, is provided with a recessed groove 12d in certain areas of the lower flat surface 12a thereof, which groove 12d is not included in the lower die member 12 illustrated in FIG. 1. The upper die member 11 illustrated in FIG. 8 is also provided a recessed groove (not shown) which is co-extensive with the lower groove 12d. The apparatus illustrated in FIG. 8 can be utilized as described above to form a modified gasket blank 25, illustrated in detail in FIGS. 9 through 11, having multiple regions of different densities and thicknesses. As illustrated therein, the gasket blank 25 includes generally flat upper and lower faces 25a and 25b, respectively, having respective upper and lower raised surfaces 25c and 25d formed therein. The flat faces 25a and 25b of the gasket blank 25 correspond to those portions of the laminae 15 and 16 which were engaged by the flat surfaces 11a and 12a of the die members 11 and 12, respectively, during the pressing operation. The raised surfaces 25c and 25d of the gasket blank 25 correspond to those portions of the laminae 15 and 16 which were engaged by the grooves 12d during the pressing operation. Thus, the grooves 12d are provided to generate regions of different thicknesses within the gasket blank 25. Apertures 25e correspond to the apertures 17c described above.

Similar to the gasket blank 20 illustrated in FIGS. 4 through 7, the gasket blank 25 includes a first density region 25f, a second density region 25g, a third density region 25h, and a fourth density region 25i. The first density region 25f extends throughout that portion of the gasket blank 25 wherein the first laminae 15 were not overlapped by the second laminae 16 durng the pressing operation and wherein the first laminae 15 were engaged by the flat surfaces 11a and 12a of the upper and lower die members 11 and 12, respectively. Thus, the first density region 25f consists only of the first laminae 15 being compressed to the relatively lesser thickness defined by the flat upper and lower faces 25a and 25b, respectively, of the gasket blank 25. The second density region 25g extends throughout that portion of the gasket blank 25 wherein the first laminae 15 were not overlapped by the second laminae 16 during the pressing operation and wherein the first laminae 15 were engaged by the grooves 12d. Thus, the second density region 12g consists only of the first laminae being compressed to the relatively greater thickness defined by the upper and lower raised surfaces 25c and 25d, respectively, of the gasket blank 25. The third density region 25h extends throughout that portion of the gasket blank 25 wherein the first laminae 15 were overlapped by the second laminae 16 during the pressing operation and wherein the first and second laminae 15 and 16, respectively, were engaged by the flat upper and lower faces 11a and 12a of the upper and lower die members 11 and 12, respectively. Thus, the third density area 25h consists of both the first and second laminae 15 and 16, respectively, being compressed to the relatively lesser thickness defined by the flat upper and lower faces 25a and 25b, respectively, of the gasket blank 25. Finally, the fourth density area 25i extends throughout that portion of the gasket blank 25 wherein the first laminae 15 were overlapped by the second laminae 16 during the pressing operation and wherein the first and second laminae were engaged by the grooves 12d. Thus, the fourth density region 25i consists of both the first and second laminae 15 and 16, respectively, being compressed to the relatively greater thickness defined by the upper and lower raised surfaces 25c and 25d, respectively, of the gasket blank 25.

In accordance with the provisions of the patent statutes, the principle and mode of operation of the present invention have been explained and illustrated in its preferred embodiments. However, it must be understood that the present invention can be practiced otherwise than as specifically explained and illustrated without departing from its spirit or scope.

What is claimed is:

1. A method of forming a gasket having a uniform thickness portion and multiple regions of different densities within the uniform thickness portion compirsing the steps of:
   (a) providing a first lamina of a gasket material;
   (b) providing a second lamina of a gasket material;
   (c) disposing the first and second laminae in partial overlapping relationship between opposed die members having respective opposed flat surface portions;
   (d) providing a perforated core;
   (e) disposing a first side of the core adjacent to the overlapped first and second laminae between the die members; and
   (f) moving the opposed die members toward each other such that the opposed flat surface portions exert a predetermined amount of force compressing the first and second laminae and the core to combine together into a unitary gasket having said uniform thickness portion including a first density region defined by that portion of the first lamina which was overlapped by the second lamina during said compression and a second density region defined by that portion of the first lamina which was not overlapped by the second lamina during said compression.

2. A method of forming a gasket having a uniform thickness portion and multiple regions of different densities within the uniform thickness portion comprising the steps of:
   (a) providing a first lamina of a gasket material having a first shape;
   (b) providing a second lamina of a gasket material having a second shape different from said first shape;
   (c) disposing the first and second laminae in overlapping relationship between opposed die members having respective opposed flat surface portions;
   (d) providing a perforated core;
   (e) disposing a first side of the core adjacent to the overlapped first and second laminae between the die members; and
   (f) moving the opposed die members toward each other such that the opposed flat surface portions exert a predetermined amount of force compressing the first and second laminae and the core to combine together into a unitary gasket having said uniform thickness portion including a first density region defined by that portion of the first lamina which was overlapped by the second lamina during said compression and a second density region defined by that portion of the first lamina which was not overlapped by the second lamina during said compression.

3. A method of forming a gasket having multiple uniform thickness portions and multiple regions of different densities within each of the uniform thickness portions comprising the steps of:

(a) providing a first lamina of a gasket material having a first shape;
(b) providing a second lamina of a gasket material having a second shape different from said first shape;
(c) disposing the first and second laminae in overlapping relationship between opposed die members having corresponding generally flat portions and corresponding raised embossments formed on the flat portions;
(d) providing a perforated core;
(e) disposed a first side of the core adjacent to the overlapped first and second laminae between the die members; and
(f) moving the opposed die members toward each other such that the opposed flat portions and the opposed raised embossments exert a predetermined amount of force compressing the first and second laminae and the core to combine together into a unitary gasket having a first uniform thickness portion defined by the engagement of the flat portions therewith including a first density region defined by that portion of the first lamina which was overlapped by the second lamina and which was not engaged by the raised embossments of the die members during said compression and a second density region defined by that portion of the first lamina which was not overlapped by the second lamina and which was not engaged by the raised embossments of the die members during said compression, and further having a second uniform thickness portion defined by the engagement of the raised embossments therewith including a third density region defined by that portion of the first lamina which was overlapped by the second lamina and which was engaged by the raised embossments of the die members during said compression and a fourth density region defined by that portion of the first lamina which was not overlapped by the second lamina and which was engaged by the raised embossments of the die members during said compression.

4. The invention defined in claim 1 further including the steps of providing third and fourth laminae of gasket material, disposing the third and fourth laminae in partial overlapping relationship between the opposed die members, and disposed a second side of the core adjacent to the overlapped third and fourth laminae before said die members are moved such that said third and fourth laminae are also combined into a unitary gasket by said compression.

* * * * *